Aug. 31, 1926.
E. A. BARBET
1,598,547
METHOD OF REMOVING TAR FROM THE VAPORS ARISING FROM THE CARBONIZATION OF WOOD
Filed Oct. 20, 1921
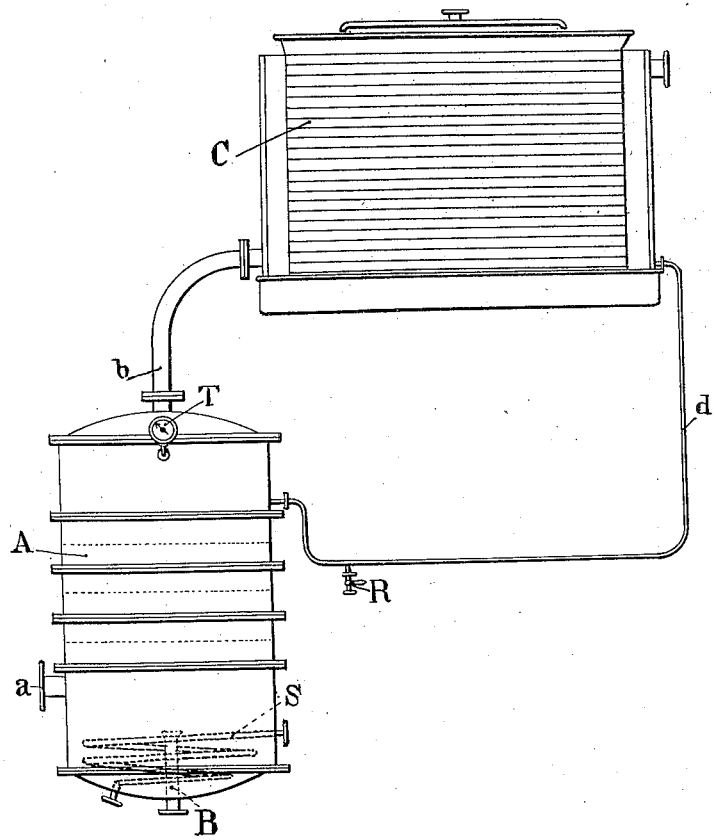
Inventor
E. A. Barbet,
By Marks&Clerk
Attys.

Patented Aug. 31, 1926.

1,598,547

UNITED STATES PATENT OFFICE.

EMILE AUGUSTIN BARBET, OF PARIS, FRANCE.

METHOD OF REMOVING TAR FROM THE VAPORS ARISING FROM THE CARBONIZATION OF WOOD.

Application filed October 20, 1921, Serial No. 509,117, and in France October 21, 1920.

The hot and acid gases from the retorts in wood distillation contain a somewhat considerable proportion of tars. These tars must be eliminated as completely as possible in order to obtain acetate of lime of sufficient purity to meet the requirements of the market.

For this purpose, use is made of continuous tar removing apparatuses, various types of which have been described in my prior Patent 1,371,461.

This invention is an important improvement in the process of removing tar from the gases in question by means of which it is possible to obtain an acetate of lime reaching a purity of 85 and 86% which does not need to be fritted in order to burn out tars.

The invention will be described further with reference to the accompanying drawing illustrating a suitable apparatus shown in elevation.

In the drawing A represents the tar removing tower having a variable number of splash plates of any suitable construction, many types being known in the art. The caps of these plates must be of a type capable of being easily cleaned. The moist wood gases containing pyroligneous acid vapors enter at the bottom through the pipe $a$. These gases have a temperature between 120 and 115° C. They pass through the plates and issue at the top through the pipe $b$ at a temperature of about 100° C.

These gases and vapors pass thence into a water condenser C, adapted to condense only a small portion of the vapors, that is to say the vapors having the greatest densities, i. e. tars, creosote oils, acetic acid, water, and traces only of alcohol. The gases issuing from the condenser must still have a temperature of about 65° to 75° C. They pass from this condenser into a series of efficient coolers which complete the cooling of the gases.

A portion of the liquid which is condensed in C flows back through the pipe $d$ on the upper plate of A and condenses or scrubs the tars and the less volatile materials, and causes them to pass down to the lower part of A. The methyl alcohol and acetic acid are revaporized so that the tar itself is freed from acetic acid as it passes down from plate to plate. The removal of the acetic acid is completed by means of a steam coil S immersed in the tar at the lower part of A through which body of tar the gases entering the apparatus first pass. The tar entirely freed from acetic acid is finally discharged through the overflow pipe B.

The vapor not condensed in C passes to the efficient coolers connected to C (not shown). In these coolers all of the vapors are condensed forming a liquid containing acetic acid, a small quantity of insoluble creosote oil, water and methyl alcohol. This liquid must be amber colored but not yellow. If it was too much colored, that is to say tarry, the volume of cold water in the condenser C would be increased, in order to increase slightly the volume of the reflux liquid $d$, but however, without lowering the temperature of the thermometer T beyond 90° C.

It is desirable to draw off from time to time, through the cock R, a sample of the reflux liquid in order to control its color and its composition.

One might operate in a slightly different manner. The vapors passing through $b$ are caused to enter one or more coupled condensers, capable of cooling the gases down to 30° to 40° C. and consequently free them of nearly all the condensable vapors. The cock R would serve to draw off about three-fourths of the condensed liquid, in order to allow the remaining quarter to enter the apparatus A. The color of the liquid drawn off would tell whether the cock R was to be opened or closed thus regulating the amount of liquid returned to A.

Satisfactory results may thus be obtained, but however the first method is the best, as in the second method, the reflux liquid is both too cold and too rich in methyl alcohol; the apparatus A is in danger of being cooled down to too low a temperature or the volume of the reflux liquid has to be restricted too much for effecting the satisfactory removal of the tars.

I claim:—

1. A process for removing tar from pyroligneous vapors from wood distillation retorts comprising passing said vapors into counter current flow with a condensate formed from said vapors, removing the uncondensed vapors, partially condensing said uncondensed vapors to remove substantially all the tar therefrom, adding condensate thus formed to the first mentioned condensate.

2. A process for removing tar from pyroligneous vapors from wood distillation retorts comprising passing such vapors in contact with successive portions of condensate formed from said vapors, said condensate being successively and increasingly poor in tar, removing the uncondensed vapors, partially condensing said uncondensed vapors to remove substantially all the tar therefrom and thus to form a condensate poor in tar and substantially free of methyl alcohol, adding condensate thus formed to one of said portions relatively poor in tar.

3. A process for removing tar from pyroligneous acid vapors from wood distillation retorts which comprises passing said vapors into a rectifying column, heating the condensate formed at the bottom of said column, withdrawing vapors from said column, partially condensing said withdrawn vapors and introducing condensate thus formed as a reflux into said column.

4. A process for removing tar from pyroligneous acid vapors from wood distillation retorts which comprises passing said vapors into a rectifying column, heating condensate thus formed in the bottom of said column to a temperature sufficient to exhaust said condensate of acetic acid, removing the vapors from said column, partially condensing said removed vapors at a temperature sufficient to condense acetic acid in said vapors but insufficient to condense any material amount of methyl alcohol contained in said vapors, returning the condensate thus formed as a reflux to said column.

In testimony I have signed my name to this specification.

EMILE AUGUSTIN BARBET.